(12) United States Patent
Hamm et al.

(10) Patent No.: US 9,192,995 B2
(45) Date of Patent: Nov. 24, 2015

(54) DIRECT ACTION POWERED SOIL PIPE CUTTER

(75) Inventors: James E. Hamm, Grafton, OH (US); Kyle Davison, North Royalton, OH (US)

(73) Assignee: EMERSON ELECTRIC CO., St. Louis, MO (US)

( * ) Notice: Subject to any disclaimer, the term of this patent is extended or adjusted under 35 U.S.C. 154(b) by 912 days.

(21) Appl. No.: 13/431,321

(22) Filed: Mar. 27, 2012

(65) Prior Publication Data

US 2012/0247288 A1 Oct. 4, 2012

Related U.S. Application Data

(60) Provisional application No. 61/468,767, filed on Mar. 29, 2011.

(51) Int. Cl.
*B23D 21/00* (2006.01)
*B26D 3/16* (2006.01)

(52) U.S. Cl.
CPC ................. *B23D 21/00* (2013.01); *Y10T 83/04* (2015.04); *Y10T 83/7226* (2015.04)

(58) Field of Classification Search
CPC ........ B23D 21/04; B23D 21/12; B23D 21/08; B23Q 5/00; B23Q 5/04; B23Q 3/06; B26D 3/169
See application file for complete search history.

(56) References Cited

U.S. PATENT DOCUMENTS

| | | | |
|---|---|---|---|
| 1,020,580 A | 3/1912 | Smith | |
| 2,716,280 A | 8/1955 | Ruhe | |
| 2,793,433 A | 5/1957 | Wheeler | |
| 2,877,549 A * | 3/1959 | Landreth | 30/99 |
| 2,949,669 A | 8/1960 | Wheeler | |
| 3,027,638 A | 4/1962 | Fightmaster | |
| 3,129,865 A | 4/1964 | Coblitz | |
| 3,263,426 A * | 8/1966 | Skoog | 464/25 |
| 3,307,760 A * | 3/1967 | Meese et al. | 225/1 |
| 3,326,304 A * | 6/1967 | Johnson | 173/169 |
| 3,380,539 A * | 4/1968 | Kaman | 173/93.5 |
| 3,460,428 A | 8/1969 | Charles | |
| 3,487,543 A * | 1/1970 | Coblitz | 30/100 |
| 3,540,640 A | 11/1970 | Coblitz | |
| 3,597,776 A * | 8/1971 | Saunders | 7/157 |
| 3,606,931 A * | 9/1971 | Karden | 173/93.5 |
| 3,929,054 A | 12/1975 | Gutshall | |
| 4,078,304 A | 3/1978 | Netzel | |
| 4,271,591 A * | 6/1981 | Aubriot | 30/100 |
| 6,122,827 A | 9/2000 | Whitaker | |
| 6,141,876 A | 11/2000 | Hamm | |
| 7,510,023 B1 * | 3/2009 | Cheng | 173/93.5 |
| 2009/0025951 A1 | 1/2009 | Frauhammer et al. | |
| 2010/0270045 A1* | 10/2010 | Ullrich | 173/47 |
| 2011/0056081 A1 | 3/2011 | Miller et al. | |

\* cited by examiner

*Primary Examiner* — Will Fridie, Jr.

(74) *Attorney, Agent, or Firm* — Mark E. Bandy; Rankin, Hill & Clark LLP

(57) ABSTRACT

A soil pipe cutting tool is described. The tool includes a telescoping housing assembly, a feedscrew in threaded engagement with the housing assembly, and a cutting chain. The cutting tool can be powered by an impact driver. Also described are rotary powered tools. In certain versions, the tools include torque limiting provisions to prevent transfer of excessively high levels of torque to a working end of the tool. Various methods of use are also described.

17 Claims, 10 Drawing Sheets

DIRECT ACTION POWERED SOIL PIPE CUTTER

CROSS REFERENCES TO RELATED APPLICATIONS

This application claims priority upon U.S. provisional application Ser. No. 61/468,767 filed Mar. 29, 2011.

FIELD

The present subject matter relates to various rotary powered tools and particularly a soil pipe cutter. The present subject matter also relates to such tools that include torque limiting provisions.

BACKGROUND

A wide array of soil pipe cutters are known in the art. Many of these use lever arms that transmit force from a ratchet assembly to a cutting chain wrapped about a pipe to be cut. Typically, such lever arms are relatively long in order for a user to generate the requisite amount of force for advancing the ratchet assembly and tightening the chain. When cutting soil pipe, and particularly previously installed pipe sections, access to the pipe is usually limited. For example, for buried pipe, after exposing the pipe by digging, the walls of the trench or hole frequently limit the degree of access around the pipe. As will be appreciated, it is undesirable to continue digging additional areas around the pipe to increase access. Also, limited access may exist for pipe installed in walls or under floors in buildings or other structures. Thus, while the use of cutters using lever arms is acceptable for uninstalled pipe, such cutters are not preferred and in many instances entirely unacceptable for situations in which pipe access is limited.

Another type of soil pipe cutter utilizes a scissor mechanism. The scissor mechanism is expanded or collapsed at one end to generate an opposite but amplified force at another end of the mechanism, at which a cutting chain is attached. Thus, operation of a scissor mechanism typically involves an expansion of the assembly at least somewhere around the region of pipe to be cut. Although satisfactory in many regards, the scissor mechanism can become obstructed or otherwise interfered with when attempting to cut pipe in limited access environments.

Additional examples of pipe cutters include the pipe cutting system described in US Patent Application Publication 2002/0124710 to MacDonald and a cutter commercially available from Wheeler-Rex under the designation 2500 KWIKSNAP. These cutters feature relatively large work surfaces for supporting a pipe and an enclosure for housing a power assist system for tensioning the cutting chain. Although satisfactory for cutting free or uninstalled sections of pipe, these devices are not appropriate for limited access cutting situations such as for installed or buried pipe. Furthermore, these devices are not amenable for transport from one cutting site to another.

Accordingly, a need remains for a portable, relatively small pipe cutter that is free of bulky components such as lengthy lever arms and expandable scissor mechanisms.

SUMMARY

The difficulties and drawbacks associated with previously known tools are addressed in the present subject matter cutting tool. Generally, a cutting tool particularly adapted for cutting relatively brittle pipe such as soil pipe is provided. The cutting tool is engaged with a rotary power source and cuts the pipe by tensioning a cutting chain about the pipe. The cutting tool includes a telescoping assembly operably engaged with a feedscrew. The cutting chain is attached to the linearly displaceable telescoping assembly. After positioning the chain about the pipe of interest, the rotary power source is activated and the telescoping assembly retracted by rotation of the feedscrew, thereby further tensioning the chain until the pipe is severed.

In one aspect, a pipe cutter is provided comprising a housing assembly including a first member and a second member slidably engaged therewith. The pipe cutter further comprises a feedscrew having a proximal end adapted for receiving a source of rotary power, an opposite distal end and an external threaded region between the proximal end and the distal end. The external threaded region of the feedscrew is threadedly engaged with the second member of the housing assembly. The pipe cutter also comprises a flexible cutting chain defining a first end and a second end. The first end is engaged to the first member of the housing assembly and the second end is engaged to the second member of the housing assembly. Upon application of torque to the proximal end of the feedscrew resulting in rotation of the feedscrew relative to the second member of the housing assembly, the second member of the housing assembly is linearly displaced relative to the first member of the housing assembly, thereby changing the distance between the first end of the cutting chain and the second end of the cutting chain.

In another aspect, a pipe cutter is provided which comprises a housing assembly including an outer primary housing member and a secondary housing member disposed within the primary housing member. The secondary housing member defines a threaded interior bore. The pipe cutter also comprises a feedscrew having a proximal end adapted for receiving a source of rotary power, an opposite distal end, and an external threaded region between the proximal and the distal ends. The distal end is disposed within the interior bore of the secondary housing member and the external threaded region of the feedscrew is threadedly engaged with the threaded interior bore of the secondary housing member. The feedscrew includes torque limiting provisions which exhibit a predefined torsional transfer limit such that upon application of a torque to a proximal end of the feedscrew greater than the predefined torsional transfer limit, the feedscrew undergoes rotational displacement to an extent such that the torque as measured at the distal end of the feedscrew is less than the predefined torsional transfer limit. The pipe cutter also comprises a flexible cutting member defining a first end and a second end. The first end is engaged to the primary housing member and the second end is engaged to the secondary housing member. Upon application of torque to the proximal end of the feedscrew resulting in rotation of the feedscrew relative to the secondary housing member, the secondary housing member is linearly displaced relative to the primary housing member, thereby changing the distance between the first end of the cutting member and the second end of the cutting member.

In another aspect, a rotary powered tool system is provided which comprises a rotary power source and a receptacle for engaging a tool for performing a desired operation. The tool system also comprises a drive assembly for selectively engaging the receptacle to the rotary power source. The drive assembly includes an integral, one-piece, longitudinal member. The longitudinal member defines a proximal end for receiving torque from the rotary power source, and an opposite distal end for transferring at least a portion of the torque to the receptacle. The member has a predefined torsional transfer limit such that upon application of a torque to the proximal end greater than the predefined torsional transfer limit, the member undergoes rotational displacement to an extent such that the torque as measured at the distal end is less than the predefined torsional transfer limit.

In still another aspect, a method for cutting a frangible member is provided. The method comprises providing a cutting tool including (i) a housing assembly having an outer primary housing member and a secondary housing member slidably positioned within the primary housing member, the secondary housing member defining a threaded interior bore, (ii) a feedscrew having a proximal end adapted for receiving a source of rotary power, an opposite distal end, and an external threaded region between the proximal end and the distal end of the feedscrew, the distal end disposed within the interior bore of the secondary housing member and the external threaded region of the feedscrew being threadedly engaged with the threaded interior bore of the secondary housing member, and (iii) a flexible cutting chain defining a first end and a second end, the first end engaged to the primary housing member and the second end engaged to the secondary housing member. The method also comprises positioning the cutting chain around the frangible member such that multiple points of contact occur between the cutting chain and the frangible member. And, the method also comprises applying torque to the proximal end of the feedscrew resulting in rotation of the feedscrew relative to the secondary housing member, the secondary housing member being linearly displaced relative to the primary housing member, thereby changing the distance between the first end of the cutting chain and the second end of the cutting chain, and thus tensioning the chain to thereby induce cutting of the frangible member.

As will be realized, the present subject matter is capable of other and different embodiments and its several details are capable of modifications in various respects, all without departing from the subject matter. Accordingly, the drawings and description are to be regarded as illustrative and not restrictive.

DETAILED DESCRIPTION OF THE EMBODIMENTS

Figure 1:
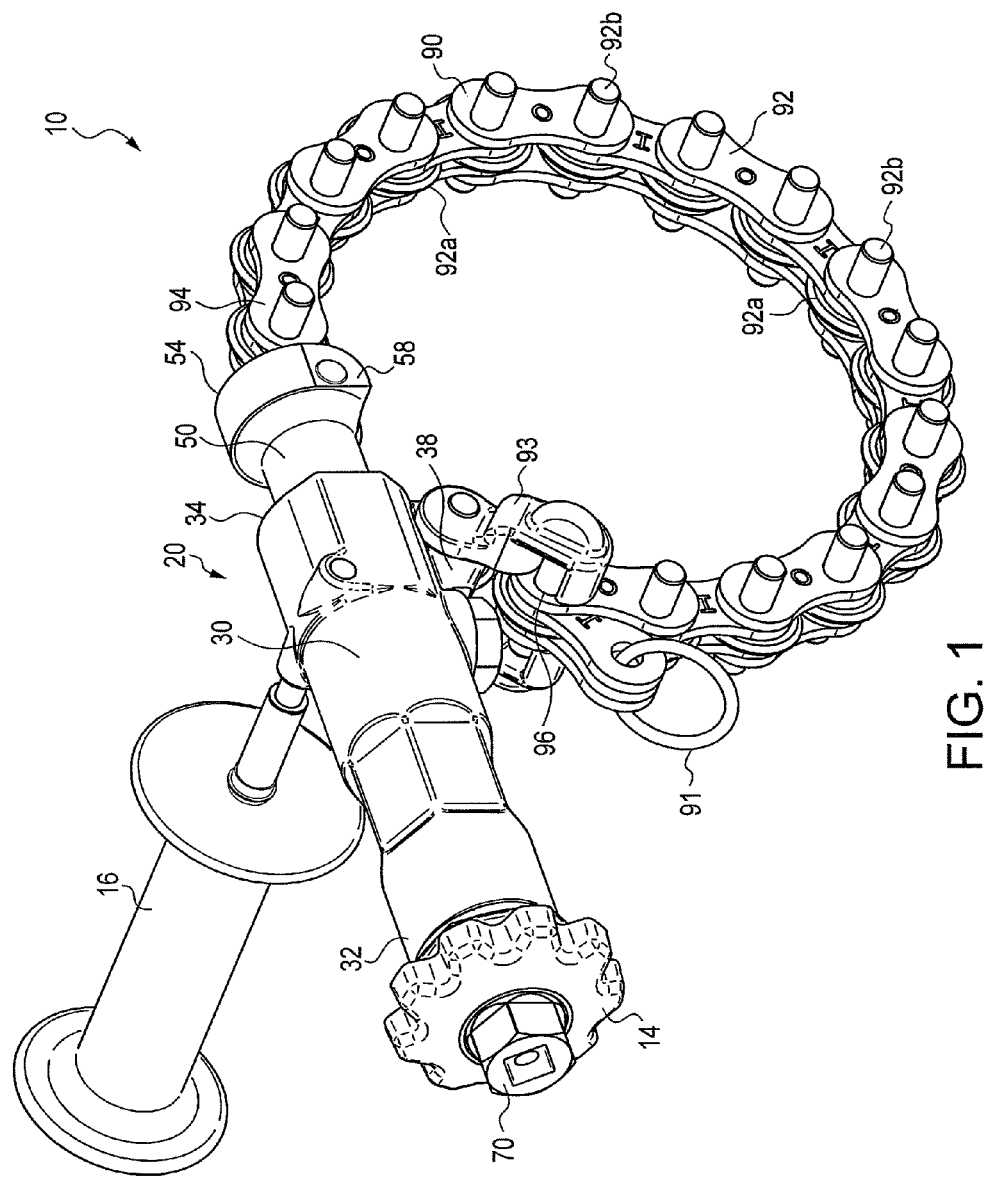
FIG. 1 is a perspective view of a preferred embodiment cutting tool in accordance with the present subject matter.

The present subject matter provides various rotary powered tools. In particular, the present subject matter provides a device for conveniently and quickly cutting relatively brittle pipes such as cast iron soil pipes. The device is adapted for selective and releasable engagement to a rotary power source which preferably is a powered impact driver and utilizes the action of impact hammer(s) of the preferred rotary power source to tension a cutting chain, which when positioned about a pipe, readily severs or cuts the pipe. The terms "cut" or "cutting" as used herein refer to any type of action in which the targeted pipe is cut, severed or otherwise fractured generally along a desired or targeted location to result in the formation of multiple sections. And, the present subject matter also provides various tools and specifically a soil pipe cutter, which include torque limiting provisions to prevent transfer of an excessively high level of torque. As described in greater detail herein, the various tools and tool systems are powered by applying an impact torque rather than a continuous torque. Thus, the various descriptions herein referring to torque are typically with regard to impact torque, unless indicated otherwise.

More specifically, the present subject matter relates to a rotary powered soil pipe cutter. In one embodiment, a rotary power source such as the previously noted impact driver, drives a male threaded member such as a feedscrew which extends into or through a telescoping cylindrical housing assembly. The feedscrew extends along a center axis of the housing assembly. The housing assembly includes an outer primary housing member and a secondary housing member that is disposed at the distal end and at least partially within the primary housing. The secondary housing member is preferably slidably disposed within and telescopically received in the outer primary housing member. The secondary housing member is threadedly engaged with the feedscrew. The feedscrew, secondary housing, and primary housing are preferably concentrically arranged. Thus, at certain locations along the primary housing, such as near the distal end of the primary housing, the secondary housing is disposed in the annular region between the centrally positioned feedscrew and the outer primary housing. The secondary housing member is configured to move telescopically in and out of the distal end of the primary housing upon rotation of the feedscrew. The secondary housing member is preferably keyed with the primary housing to prevent rotation of the secondary housing during rotation of the feedscrew. A cutting chain is attached at (i) the distal end of the secondary housing member, and (ii) an outer region of the primary housing member. A brittle soil pipe, typically cast iron, to be cut or severed, is placed within the looped cutting chain. Alternately, the cutting chain is looped around the pipe and affixed to the housing assembly at locations (i) and (ii). Operation of the rotary power source, such as a battery powered impact driver, longitudinally displaces the secondary housing member with respect to the distal end of the primary housing, thereby tightening the cutting chain about the pipe. Specifically, the secondary housing is retracted within the primary housing. Tensioning of the chain continues until the pipe is fractured or "cut".

Housing Assembly

More specifically, a preferred embodiment cutting tool comprises a housing assembly which as noted preferably includes a telescoping assembly of an outer primary housing member and a secondary housing member slidably positioned within the primary housing member. Preferably, the primary and secondary housing members are each cylindrically shaped, however the present subject matter includes other shapes and configurations. The primary housing member defines a proximal end and an opposite distal end. The proximal end is the end toward which torque is applied to an exposed end of the feedscrew or an exposed member in operable engagement with the feedscrew, which is accessible along the proximal end of the primary housing. The primary housing member generally defines a hollow interior region. Also, preferably, the outer primary housing also includes one or more provisions typically along an outer region and proximate the distal end of the primary housing, for engaging an end or a region of the cutting chain. The secondary housing member also defines a proximal end and an opposite distal end. The proximal end of the secondary housing member is closer to the proximal end of the primary housing as compared to the distal end of the secondary housing. The distal end of the secondary housing preferably includes one or more provisions for engaging an end or a region of the cutting chain. Preferably, the secondary housing member extends from or is linearly positionable with respect to the distal end of the primary housing. The secondary housing member preferably defines a longitudinally extending cylindrical hollow chamber accessible from the proximal end of the secondary housing. The cylindrical chamber includes one or more threads or thread receiving regions along at least a portion of the interior cylindrical wall of the secondary housing. The interior cylindrical chamber and the threads or thread receiving regions are sized and configured to threadedly engage the feedscrew.

Preferably, the primary and secondary housing members are keyed to one another yet are configured to allow linear movement of the secondary housing in a direction parallel with the longitudinal axis of the primary housing. This key provision prevents rotation of the secondary housing relative to the primary housing and the feedscrew. And so, upon rotation of the feedscrew, the secondary housing does not rotate, and instead moves linearly with respect to the primary housing. An example of such key provisions is (i) a recessed channel defined along an interior wall of the primary housing or along an exterior face of the secondary housing and (ii) an outwardly extending projection or "key" in the corresponding housing member, i.e. the primary or the secondary housing member.

Feedscrew

The cutting tool also comprises a feedscrew that extends from the proximal end of the primary housing, into the interior of the primary housing, and further extends into at least a portion of the cylindrical chamber defined in the secondary housing. The feedscrew preferably defines one or more threads or thread receiving regions that are sized and configured to operably engage the threads or thread receiving regions defined in the interior chamber of the secondary housing. In certain embodiments, the feedscrew may also extend through an opening or aperture defined along the distal end of the secondary housing. Preferably, an outer rotary grip is provided near a proximal end of the feedscrew such as near the location at which an impact driver or other rotary power source is engaged. The rotary grip or knob is preferably located adjacent the proximal end of the outer primary housing. The grip preferably includes a series of outwardly extending projections for improving grasping and rotating of the knob by a user.

Upon applying a rotary source of power or torque to the feedscrew during a cutting operation, the feedscrew may be placed in tension or compression. As described in greater detail herein, the tool embodiment described in conjunction with the figures utilizes a configuration in which the feedscrew is tensioned during a cutting operation. It will be appreciated that the present subject matter includes tool embodiments in which the feedscrew is placed in compression during a cutting operation.

Cutting Member

The cutting tool also comprises a flexible cutting member or chain, or a plurality of cutting chain sections. One end of the cutting chain or a link or region of the chain, is attached to the secondary housing as previously noted. And, another end of the cutting chain or a link or region of the chain or a different section of cutting chain is attached to the primary housing. The points of attachment are preferably at a distal end or region of each of the primary and secondary housings. In certain embodiments, it may be preferred to affix one end of the chain to one of the primary and secondary housings, and a chain hook member to the other housing. Prior to a cutting operation, the chain can be positioned about a pipe and the loose end of the chain quickly and easily engaged with the chain hook. If multiple chain sections are used such as to lengthen the chain for cutting large diameter pipes, it is preferred to provide releasable engagement provisions on corresponding ends of the cutting chain as described in greater detail herein. It will be understood that the term "chain sections" as used herein refers to portions of the overall cutting chain used in the cutting tool which can be selectively and readily engaged with one another. In certain embodiments, the chain sections can be readily engaged with one another and disengaged from one another without the use of any tools. Thus, a user can easily disengage two or more chain sections from one another manually. And, a user can easily engage or otherwise attach two or more chain sections to one another.

Although in many versions of the tools cutting chains are used, the present subject matter includes the use of cutting members besides or in addition to chains. For example, collections of cutting members movably joined to one another could potentially be used. Also, cables or flexible cutting cords could also be used depending upon the application.

Rotary Power Source

A wide array of rotary power sources and preferably impact drivers can be used with the various cutting tools described herein. Before addressing the preferred rotary power source for driving the cutting tool, it is important to address the preferred requirements for the rotary power source and define the term "impact driver" as used herein. Generally, any rotary power source can be used for driving the cutting tool, so long as the rotary power source can deliver sufficient torque. It is preferred that the rotary power source provide a torque as a result of an impact, i.e. hammer(s) and anvil mechanism. Torque provided by such mechanism has very little associated reaction torque. Torque produced in such a manner is periodically referred to herein as "impact torque." Various torque producing devices and/or tools are known. Several of these produce an axial force component in conjunction with a rotary force, i.e. torque, component. The present subject matter cutting tools do not require an axial force component. Instead, only a rotary force component is desired. Thus, the term "impact driver" as used herein refers to a rotary power source capable of providing the requisite level of torque, without any substantial axial force component, and with a relatively low reactive torque. As previously noted, rotary power sources that provide torque as a result of a series of impacts such as by use of a hammer and anvil mechanism, provide such force. Preferably, the impact driver is a cordless, battery powered impact driver. Examples of such impact drivers include, but are not limited to, commercially available impact drivers.

Although the present subject matter cutting tools can be powered or operated by a variety of rotary power sources, an impact driver is preferred as compared to a drill or other rotary power sources. Rotary power sources using electrically powered motors which provide a continuous torque are not preferred for use with the present subject matter cutting tools because they typically exhibit relatively high reaction torque forces which must then be countered by the user. Impact drivers are characterized by producing relatively small levels of reaction torque, e.g. typically less than 5 foot-pounds, while still generating relatively high levels of torque, e.g. at least 100 foot-pounds.

In operation, a rotating mass (the hammer) is accelerated, then suddenly connected to an output shaft (the anvil), creating a high-torque impact. The hammer mechanism is designed such that after delivering the impact, the hammer is again allowed to spin freely, and does not stay locked. With this design, the only reaction force applied to the body of the tool is the motor accelerating the hammer, and thus the operator feels very little torque, even though a very high peak torque is delivered to the drive output.

Generally, the rotary power source used for driving the cutting tool should be able to provide a torque of at least about 200 foot-pounds of force. However, it will be appreciated that depending upon (i) the particular size and configuration of the cutting tool and (ii) size and type of pipe to be cut, rotary power sources providing lower torque or rotary power sources providing greater torque could be used. As previously noted, it is preferred that the rotary power source provide an impact torque output rather than a continuous torque output. The previously described impact driver provides an impact torque output. Preferably, the impact driver outputs a torque of at least 100 foot-pounds, more preferably at least 150 foot-pounds, and most preferably at least 200 foot-pounds. Commercially available cordless impact drivers are known which provide up to 475 foot-pounds or more of torque.

Typically, suitable commercially available impact drivers are provided with ⅜, ½, or ¾ inch square drives. A ½ inch drive is preferred. However, impact drivers or other comparable sources of rotary power having different sizes or configuration could also be used so long as sufficient torque can be provided to the cutting tool. The rotary power source, and preferably the impact driver, is cordless and is preferably battery powered, pneumatically powered, or hydraulically powered. Although the rotational speed of the rotary power source is not critical, typically the rotary power source, e.g. preferably an impact driver, is capable of a no load speed of from about 1,000 RPM to about 2,000 RPM.

It will also be appreciated that the preferred embodiment cutting tools could be operated using other rotary power sources or manual power sources. Thus, the present subject matter is not limited to the cutting tools being powered by an impact driver. For example, hand operated ratchet wrenches, bars with wrench ends or sockets, or similar manually powered tools could potentially be used to drive the preferred embodiment cutting tools.

Torque Limiting Provisions

In certain embodiments of the present subject matter, it may be preferred to include one or more torque limiting provisions such that if an excessively high level of impact torque is applied to the input of the cutting tool, e.g. at the proximal end of the feedscrew, the excessive torque load is not transmitted to other component(s) of the tool which could result in damage to the tool. A preferred form of a torque limiting provision is a narrowed or reduced diameter region along a portion of the feedscrew, and preferably near the proximal end of the feedscrew. In the event that an excessive level of torque is applied to the proximal end of the feedscrew, the region of reduced diameter of the feedscrew deflects or flexes to thereby significantly reduce the amount of torque otherwise transmitted to the distal end or an intermediate region of the feedscrew. It will be appreciated that this type of torque limiting provision is particularly directed for limiting transfer of impact torque rather than continuous torque. Hence, this is another reason why an impact driver is preferred for use in powering the cutting tools described herein.

The subject matter is not limited to cutting tools having a torque limiting provision in the form of a reduced diameter region along the length, or a portion of the length, of the feedscrew. Instead, the subject matter includes other structures and strategies for limiting torque. For example, it is contemplated that torque limiting provisions could be provided between an impact driver and the cutting tool, such as for example in the form of an extension member. Alternatively, torque limiting provisions could be provided or incorporated into the cutting tool by particular thread configurations in one or both of the feedscrew and/or the secondary housing member. It is also envisioned that a torque limiting provision could be incorporated into an interface engagement assembly between an impact driver and the cutting tool. Although not wishing to be limited to any particular value or level of torque, it is contemplated that one or more torque limiting provisions be incorporated in the cutting tool to prevent transfer of torque past the provisions, which exceeds about 200 foot-pounds of torque. This torque value is representative of a tool for cutting soil pipes having a diameter of up to about 8 inches. It will be appreciated that the present subject matter tools and systems can be adapted to accommodate and/or output significantly higher levels of torque.

In a particularly preferred embodiment, a torque limiting provision is in the form of a longitudinal member having a proximal end for receiving torque such as from a rotary power source, and an opposite distal end for transferring at least a portion of that torque. Preferably, the longitudinal member is an integral, one-piece member. The longitudinal member has a predefined torsional transfer limit such that upon application of an impact torque to the proximal end greater than the predefined torsional transfer limit, the member undergoes rotational or flexural displacement to an extent such that the impact torque as measured at the distal end is less than the predefined torsional transfer limit. Representative values of the torsional transfer limit are typically within a range of from about 100 or less, to about 200 foot-pounds of torque, and often about 150 foot-pounds of torque.

More specifically, a torque limiting provision in the form of a longitudinal member preferably includes a region of reduced cross-sectional area. For longitudinal members having circular cross sections, the region of reduced cross-sectional area tends to reduce the torsional stiffness of the member, thereby reducing the amount of torque transmitted to the distal end of the member. The extent of torque transmitted by the longitudinal member is dependent upon the material of the longitudinal member, the length and the cross-sectional area of the longitudinal member. These factors, i.e. the material and the dimensional aspects of the longitudinal member can be expressed by a single characteristic—the torsional stiffness of the longitudinal member. A higher or greater torsional stiffness means that there is less angular deflection or "twist" in the longitudinal member for a given torque.

In order to further evaluate the use of torque limiting provisions in the various tools and systems described herein, a series of trials were conducted using longitudinal members having differing dimensional aspects and formed from various grades of steel. For each longitudinal member, the torsional stiffness was determined or estimated. An impact torque or "input impact torque" was applied to an end of the longitudinal member and the transmitted torque then measured at an opposing end. Specifically, using a DEWALT corded impact tool from DeWalt Industrial Tool Co. of Baltimore, Md., having an input torque rating of 345 ft-lbs, each of the various longitudinal members were engaged therewith. The impact tool was then operated so as to apply an impact torque to each of the longitudinal members. Table 1 set forth below, summarizes these evaluations.

sional stiffness ($T_s$). Thus, the present subject matter, and in particular the various tools described herein, include other configurations of longitudinal members that limit torque transfer.

Methods

The cutting tool is used to cut a frangible member or pipe such as a cast iron soil pipe in several methods as follows. In one approach, the tool is positioned and preferably secured to the pipe to be cut. This is performed by positioning the cutting tool to the pipe, looping the chain about the pipe, and manually tightening the chain about the outer periphery of the pipe. Preferably, the cutting chain is looped around the pipe such that multiple points of contact occur between the cutting chain and the pipe. Manual tightening can be performed by rotating a knob engaged with the feedscrew. Depending upon the degree of tightening of the chain, the cutting tool may be retained or attached to the pipe in a desired position. An impact driver is then engaged with the cutting tool. In another approach, the cutting tool is first engaged with an impact driver and then the previously noted operations of chain posi-

TABLE 1

Summary of Torque Limiting Provisions

| Longitudinal Member | Manufacturer Rated Input Torque (ft-lbs) | Nominal Length (in) | Shaft Diameter (in) | Length of Reduced Cross-Sectional Area (in) | Torsional Stiffness (ft-lbs) | Average Transmitted Torque (ft-lbs) |
|---|---|---|---|---|---|---|
| A | 345 | — | 0.62 | 4.197 | 3255 | — |
| B | 345 | — | 0.409333333 | 4.781 | 543 | 68 |
| C | 345 | — | 0.456 | 4.883 | 819 | 86 |
| D | 345 | — | 0.549 | 5.133 | 1636 | 112 |
| E | 345 | 8 | 0.53 | 7.436 | 981 | 99 |
| F | 345 | 10 | 0.636 | 7.988 | 1894 | 128 |
| G | 345 | 4 | 0.633 | 3.889 | 3817 | 141 |
| H | 345 | 3 | 0.624 | 2.994 | 4681 | 173 |
| I | 345 | 3 | 0.64 | 0.996 | 15572 | — |
| J | 345 | 4 | 0.639 | 4.062 | 3795 | — |
| K | 345 | 3 | 0.622 | 3.009 | 4599 | — |
| L | 345 | — | 0.747 | 0.4816 | 59771 | — |
| M | 345 | — | 0.746 | 0.4768 | 60050 | — |
| N | 345 | — | 0.618 | 1.0172 | 13257 | — |

Figure 15:
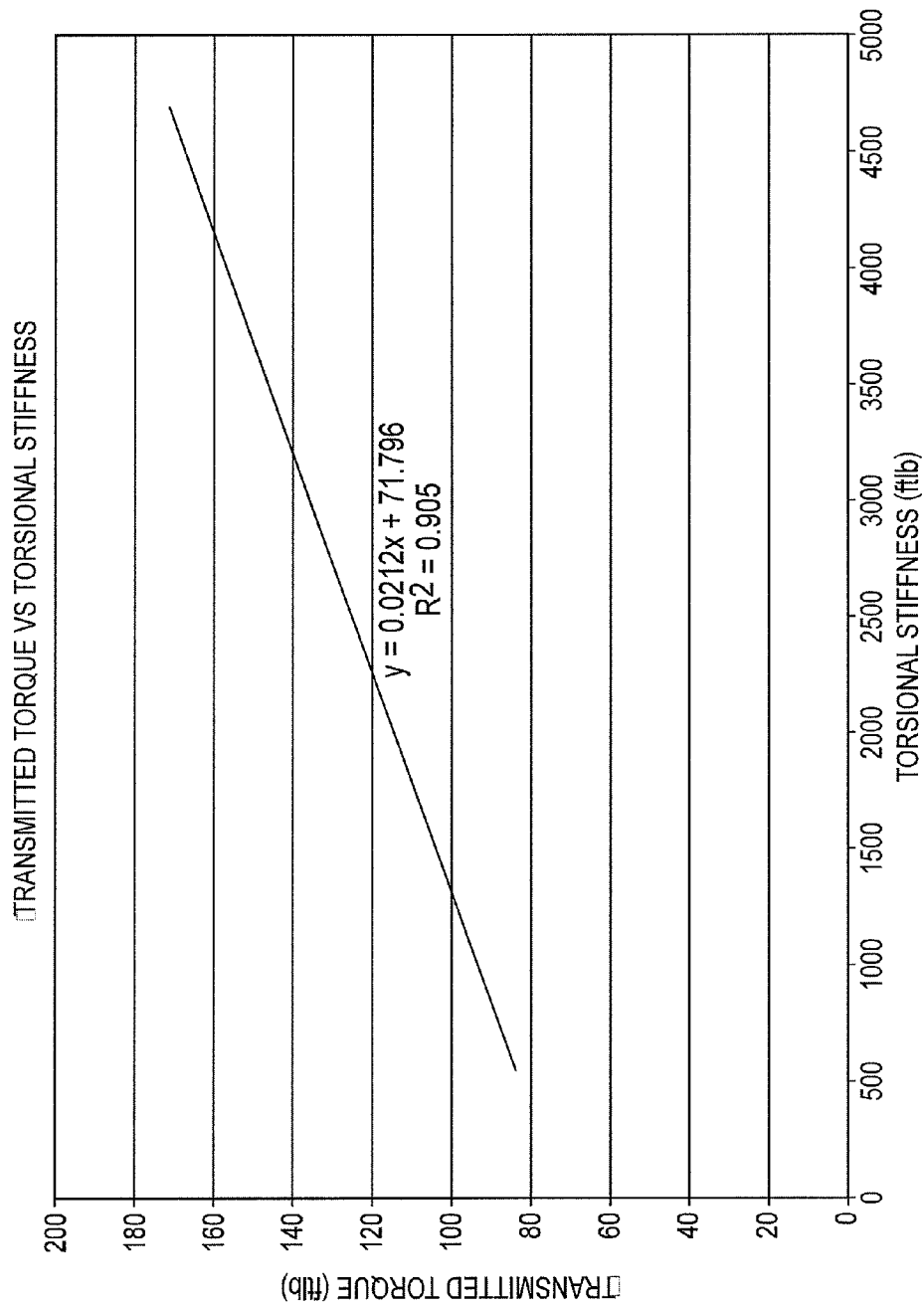
FIG. 15 is a graph of transmitted torque and torsional stiffness for a torque limiting provision in accordance with the present subject matter.

FIG. 15 is a graph of transmitted torque versus the torsional stiffness of the longitudinal members evaluated and summarized in Table 1. The various data in FIG. 1 can be interpolated to arrive at an approximate relationship between the transmitted torque $T_t$ (y axis) and the torsional stiffness $T_s$ (x axis). This approximate relationship is set forth below as equation (I):

$$T_t = 0.0212(T_s) + 71.796 \quad (I)$$

$T_t$ is transmitted torque in ft-lbs, and $T_s$ is torsional stiffness in ft-lbs.

Thus, FIG. 15 provides a convenient "look up" table for quickly identifying the particular torsional stiffness for a desired transmitted torque. For example, if a tool is to be provided in which the maximum transmitted torque to be exhibited at the tool end (or distal) is about 150 ft-lbs, then the longitudinal member should be configured so as to exhibit a torsional stiffness of about 3689 ft-lbs. As will be understood, instead of referring to FIG. 15, equation (I) can be used.

It will be appreciated that in no way is the present subject matter limited to any of the longitudinal members described herein, characteristics thereof, or the representative relationship noted herein between transmitted torque ($T_t$) and tortioning and manual chain tightening are performed. In both approaches, after set up of the impact driver and tool on the pipe of interest, the impact driver is then actuated to power the cutting tool and tension the chain to thereby cut the pipe.

In either approach, several other considerations are as follows. Depending upon the size of the pipe to be cut, the appropriate position of the secondary housing relative to the primary housing is selected by the operator. Preferably, the linear position of the secondary housing with respect to the primary housing can be manually adjusted by rotating an outer rotary grip that is engaged to the feedscrew. As will be understood, the linear position of the secondary housing relative to the primary housing depends upon the size, i.e. the diameter, of the pipe to be cut. Either prior to or after adjustment of the position of the secondary housing, the cutting chain and an optional chain hook are then engaged with one another as previously described and in such a fashion that minimal slack exists in the resulting chain loop extending about the outer periphery of the pipe to be cut. After engagement between the cutting tool and the impact driver, the impact tool is then activated to cause tensioning of the chain. Continued rotation and application of torque by the impact tool causes linear movement of the secondary housing relative to the primary housing and further tensioning of the cutting chain about the pipe, resulting in eventual cutting or fracturing of the pipe.

It is also contemplated that instead of direct contact and engagement between the impact driver and the cutting tool, an impact socket or other components could be used between the driver and cutting tool to engage them.

Another cutting method in accordance with the present subject matter involves performing a series of scoring operations along an outer periphery of a pipe to be cut using the cutting tool. After a plurality of scores have been formed, a cutting operation as previously described is performed to obtain a cut face along the cut pipe sections which is relatively smooth, clean, and free of irregular regions. Specifically, each scoring operation is preferably performed by positioning the culling tool and chain so that the chain extends about the outer pipe periphery and along the desired cut line, manually tightening the chain, and applying a short duration of powered impact torque to the cutting tool so that the cutting wheels of the chain are slightly urged into the pipe wall. This forms a series of "scores" or indentations spaced apart from one another generally extending along the cut line or a portion thereof on the outer periphery of the pipe. Next, the cutting tool and chain are repositioned relative to the pipe such that the chain extends along the cut line, but the cutting wheels or cutting members of the cutting chain are now in contact with the pipe outer surface between the previously formed scores. The chain is manually tightened and a short duration of powered impact torque applied to the cutting tool to form a new set of scores along the outer surface of the pipe. This operation may be repeated again if desired. After formation of a relatively continuous line comprised of the numerous scores, a cutting operation is then performed.

Additional Features

All components of the preferred embodiment cutting tools described herein are formed of materials that exhibit sufficient strength, rigidity, and durability for repeated and consistent tool use. Preferably, the housing members and feedscrew are formed from steel or other alloys of comparable strength. The cutting chain and chain hook and associated cutting wheels, links, and posts are preferably formed from steel or other suitable materials. Hardened steel is preferred for the cutting wheels.

The present subject matter cutting tool can be used to cut a wide range of pipe sizes. Preferably, the cutting tool is sized and configured to accommodate cutting pipes in a size range of from 1½ inches to 8 inches. Thus, a single tool can be used for cutting a relatively large range of pipe diameters. The cutting tool is adjusted to accommodate different pipe diameters by appropriate positioning of the secondary housing and optional lengthening of the chain. It is contemplated that the cutting tool can be used to cut significantly larger pipes such as up to 12 inches or larger in diameter.

The length of the cutting chain provided with the cutting tool may also vary. For example, a cutting chain may be provided that has sufficient length to cut an 8 inch diameter pipe. Alternatively, one approach for reducing the weight of the cutting tool and chain is to provide a shorter chain. For example, shorter chain lengths could be used, such as a length sufficient to cut a 6 inch diameter pipe or a 4 inch diameter pipe. For situations in which a cutting tool capable of cutting relatively large pipes, e.g. up to 8 inches, is provided with a shorter chain, e.g. a chain having a length capable of cutting up to a 4 or 6 inch pipe; the chain can be readily lengthened by coupling another chain thereto. It will be understood that the present subject matter cutting tools can be used for cutting pipes having sizes different than those noted herein, for example smaller than 1½ inches, and/or greater than 12 inches.

Furthermore, although the present subject matter cutting tool has been described for cutting cast iron pipe, it will be appreciated that pipes or workpieces formed from other materials can also be cut or otherwise severed using the present subject matter tool.

The preferred embodiment cutting tools provide numerous advantages over prior art tools. For example, the preferred embodiment tools are relatively small, lightweight, and portable. This enables the tools to be readily transported and as previously explained, used in a wide range of limited access environments.

The preferred embodiment cutting tools also provide relatively fast set up since the tools need only be engaged with an impact tool and the chain positioned about the pipe to be cut.

Furthermore, the cutting tools provide relatively fast set up and cutting times, typically in less than 30 seconds.

Additionally, the tools can be provided with dimensional designations for pipe size and simple adjustments which enable the tools to be used with a wide range of pipe sizes.

Although it is preferred that the preferred embodiment cutting tools are used by attachment or coupling to a hand-held portable, typically cordless and battery powered, impact tool; it will be appreciated that the tools can be used with a wide array of other force-generating devices. And, it will be readily understood that the preferred embodiment cutting tools can be used with a variety of torque-generating tools or force-generating assemblies that are not battery powered, but instead, powered from other machine or human powered sources.

Powered Tool Systems

Also provided are systems which comprise a rotary power source, a tool or a receptacle for engaging a tool, and a drive assembly for selectively engaging the tool or receptacle to the rotary power source. The rotary power source can be as previously described herein. Preferably, the rotary power source is an impact driver. In many versions, the drive assembly includes torque limiting provisions. Preferably, the torque limiting provisions are as described herein.

Embodiments

FIGS. 1-5 illustrate a preferred embodiment cutting tool 10 in accordance with the present subject matter. The cutting tool 10 comprises a housing assembly 20 including a primary housing 30 and a secondary housing 50. The cutting tool 10 also comprises a feedscrew 70, a cutting chain 90, a rotary grip 14, and an optional handle 16. The rotary grip 14 is affixed or otherwise engaged with a proximal end of the feedscrew, which is disposed within the primary and secondary housings. The handle 16 is preferably releasably and/or selectively engaged with a circumferential bracket or mounting provision which is secured to the primary housing 30.

The primary housing 30 defines a proximal end 32 and an oppositely located distal end 34. The primary housing 30 also includes an interior cylindrical wall 31 which defines an interior hollow chamber 33. The primary housing 30 also includes a chain engagement provision 38 for affixing or securing an end or region of a cutting chain 90 thereto.

The secondary housing 50 defines a proximal end 52, an opposite distal end 54, and an interior cylindrical wall 51 which defines an interior hollow chamber 53. The secondary housing 50 also includes a chain engagement provision 58 for affixing or securing an end or region of the cutting chain 90 thereto.

Figure 3:
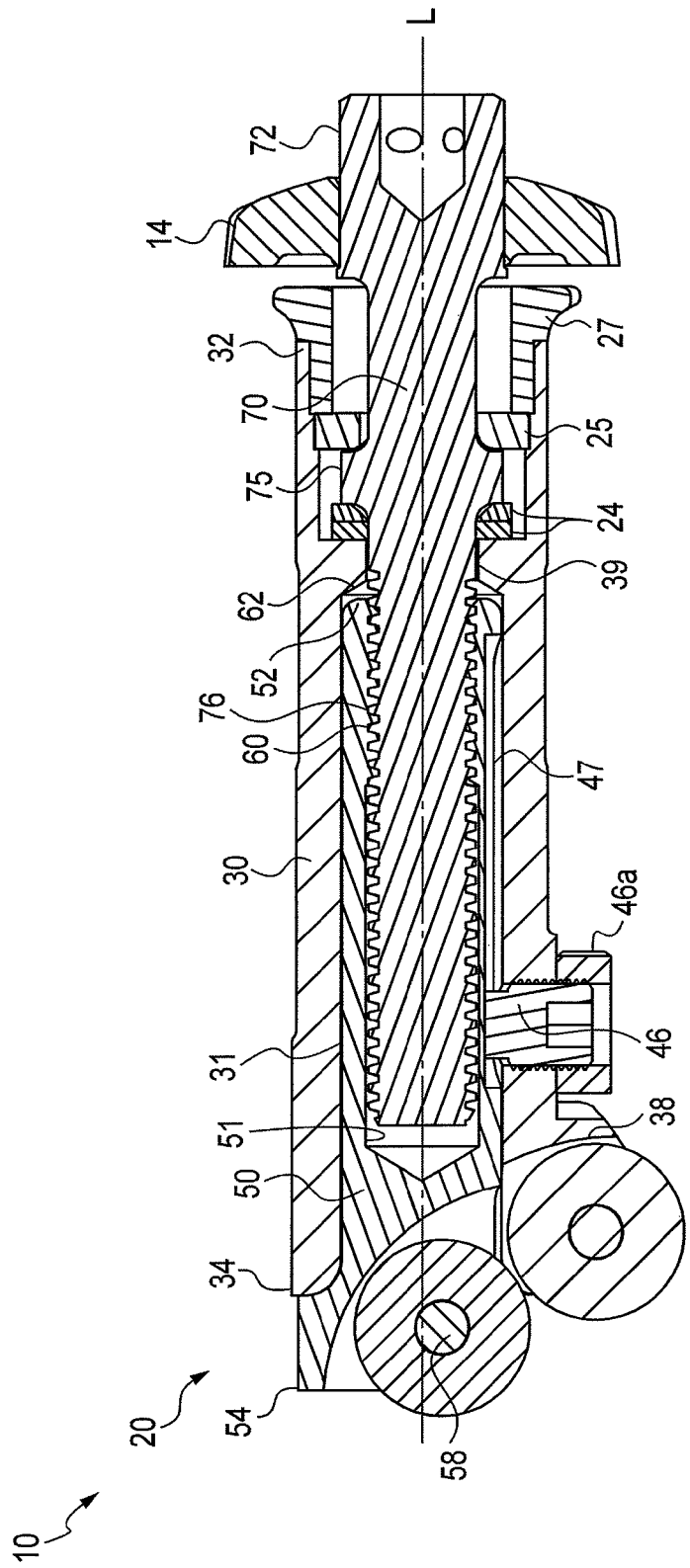
FIG. 3 is a cross sectional view taken across a longitudinal axis of a portion of the assembled tool showing a position of full retraction.
Figure 4:
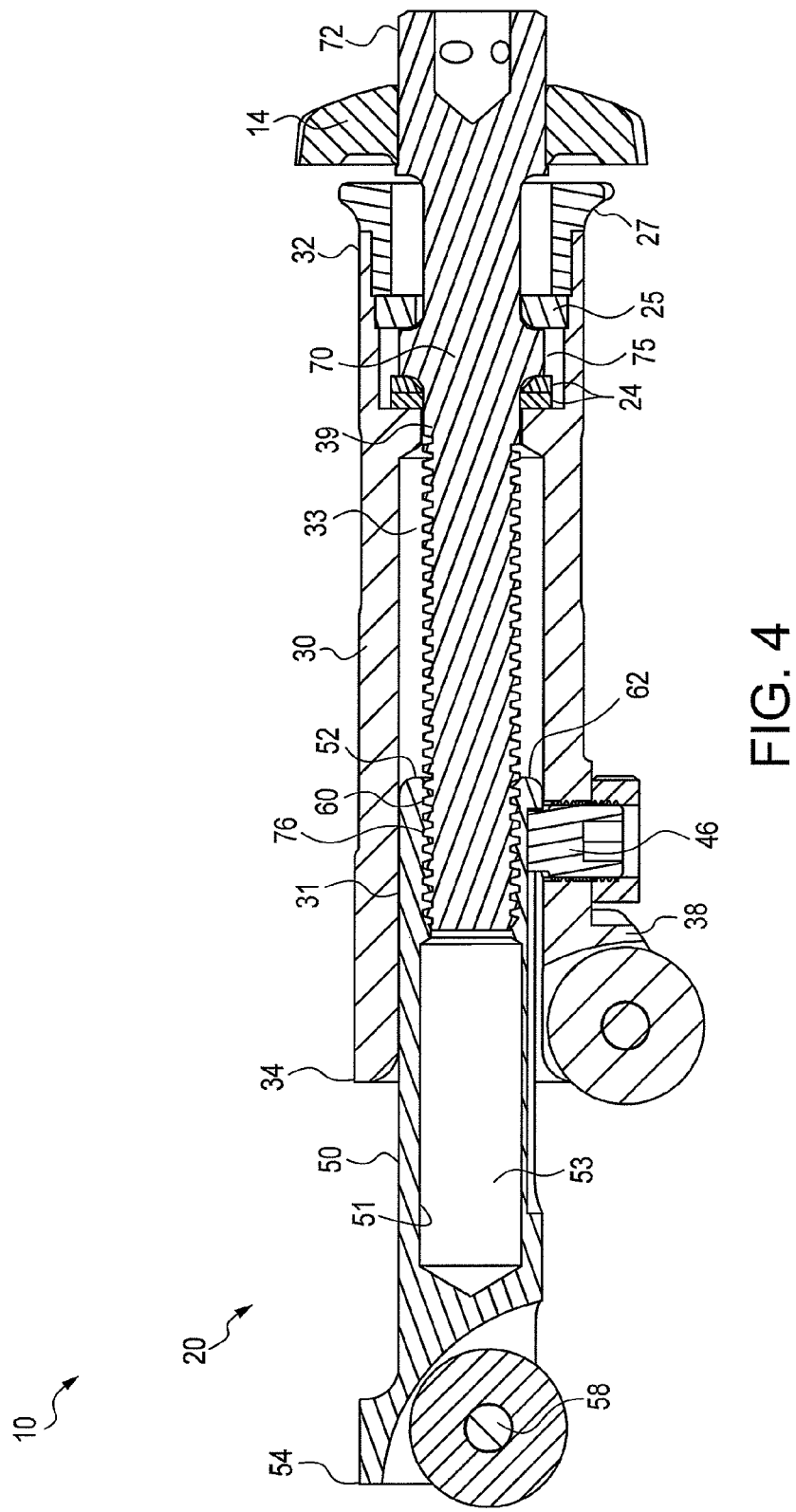
FIG. 4 is a cross sectional view taken across the longitudinal axis of a portion of the assembled tool showing a position of full extension.
Figure 5:
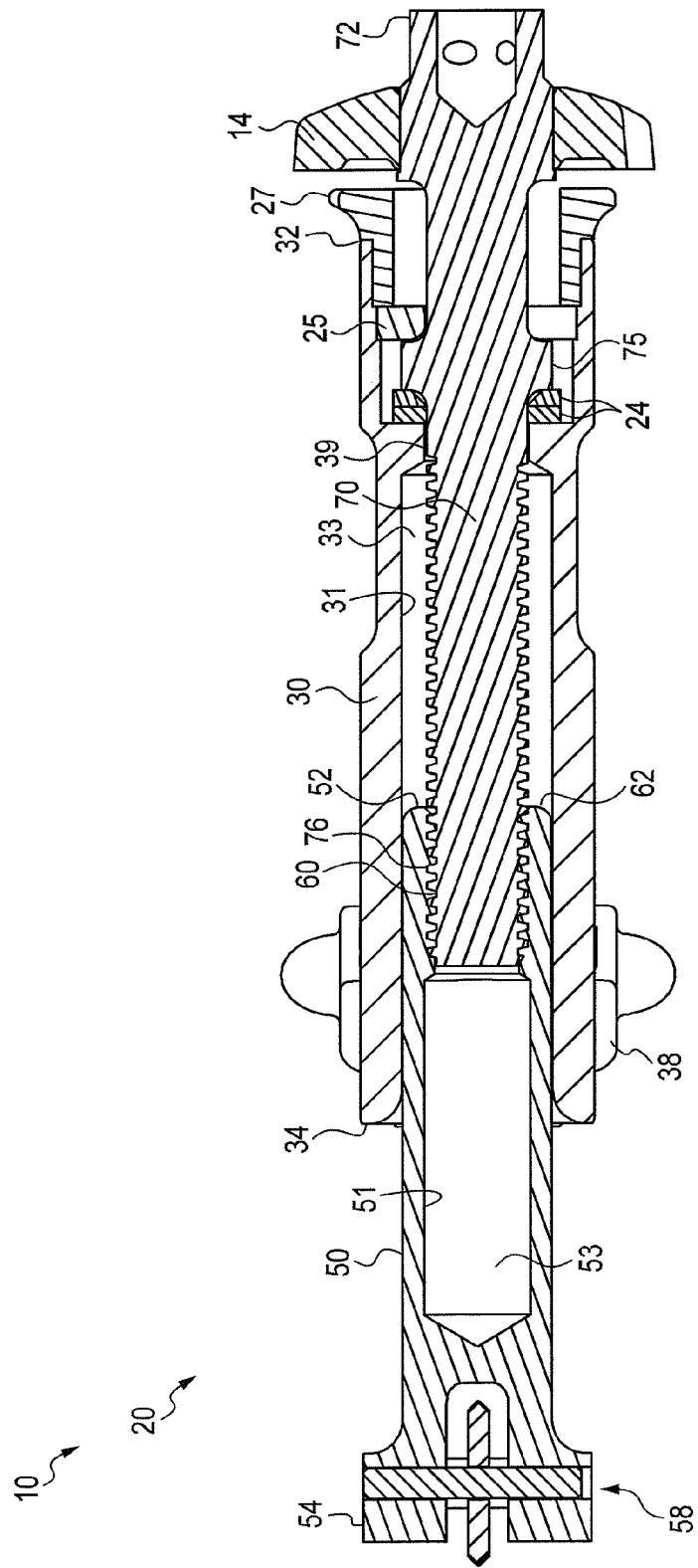
FIG. 5 is a similar cross sectional view as FIG. 4, in which the tool is rotated 90° about its longitudinal axis.

FIGS. 3-5 illustrate additional details and aspects of the preferred embodiment cutting tool 10. FIG. 3 is a cross sectional view of the cutting tool 10 taken across a longitudinal axis L of a portion of the assembled tool showing a position of full retraction of the secondary housing 50 within the primary housing 30. FIG. 4 is a cross sectional view taken across the longitudinal axis of a portion of the assembled tool showing a position of full extension. And FIG. 5 is a similar cross sectional view as FIG. 4, in which the tool is rotated 90° about its longitudinal axis to illustrate additional structural aspects. The interior configuration of the tool 10 is illustrated in FIGS. 3-5. Specifically, the secondary housing 50 is depicted having the proximal end 52 opposite the distal end 54. The interior hollow chamber 53 is generally defined between the ends 52, 54 of the secondary housing member 50. The hollow chamber 53 is defined by the interior circumferential or cylindrical wall 51 extending between the ends 52, 54 of the secondary housing. The secondary housing 50 also preferably defines an aperture 62 at the proximal end 52. In certain embodiments, the secondary housing 50 may also define another aperture at the distal end 54 of the housing for providing additional access into the hollow chamber 53. One or more threads 60 or thread receiving regions are preferably defined in the circumferential wall 51 of the secondary housing 50.

Figure 2:
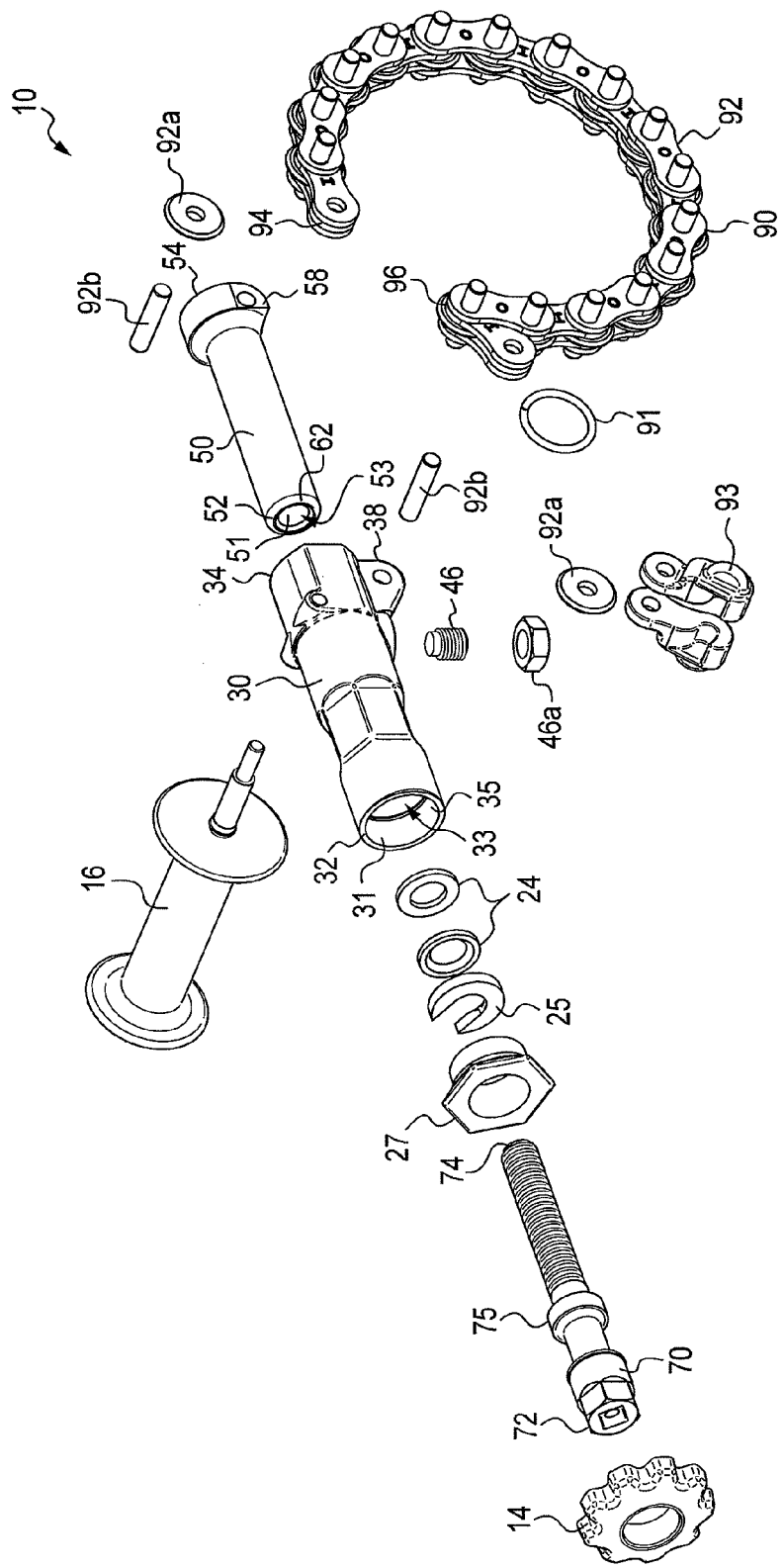
FIG. 2 is an exploded view of the preferred embodiment cutting tool depicted in FIG. 1.

As previously noted, it is preferred that the cutting tool includes provisions to prevent the secondary housing 50 from rotating with respect to the primary housing 30 such as during application of torque to the feedscrew 30. FIG. 2-4 illustrates one form of such a configuration. A threadedly engaged key member 46 is provided along the interface between an outer region of the secondary housing 50 and an inner region of the primary housing 30. The key member 46 is threadedly received in an aperture 49 defined in the primary member 30 and extends inward into a channel 47 defined along a portion of the length of the secondary housing 50. The key member 46 is selectively radially positioned with respect to the channel 47 defined in the secondary housing 50 by rotating the member 46. Upon reaching a desired position, e.g. the inwardly directed end of the key member 46 being disposed within the channel 47, the position of the key member 46 can be secured by use of a jam member 46a such as shown in FIGS. 2 and 3. Threaded engagement between the key member 46 and the jam member 46a and tightening of the jam member 46a secures the key member 46 within the aperture 49 defined in the primary housing 30. It will be appreciated that the subject matter includes other configurations and components to prevent rotation of the secondary housing 50 with respect to the primary housing 30. For example, a slotted recess could be formed in one of the primary or secondary housings and an outwardly projecting key sized and shaped to fit within the slot, be provided on the other housing. The slot is oriented parallel with the axis of rotation of the feedscrew and along at least a portion of the length of the corresponding housing member to thereby allow telescoping linear movement, but prevent relative rotation from occurring.

Figure 6:
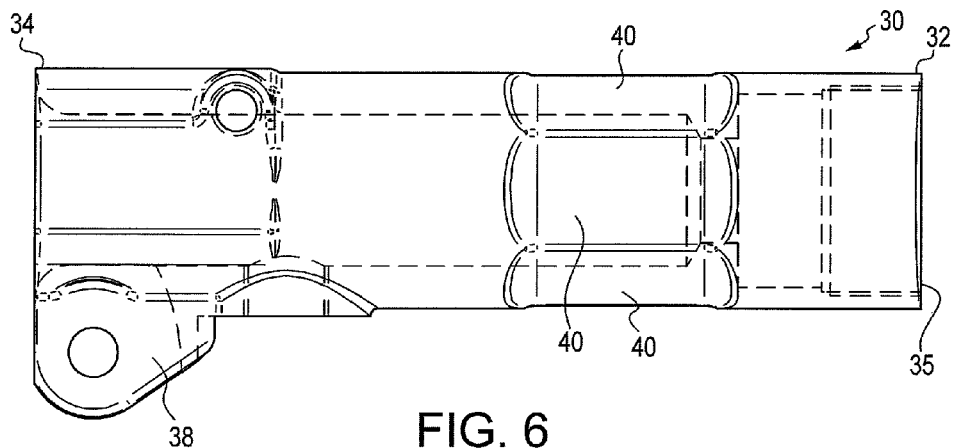
FIGS. 6-8 illustrate a preferred configuration for an outer primary housing of the preferred embodiment tool.
Figure 7:
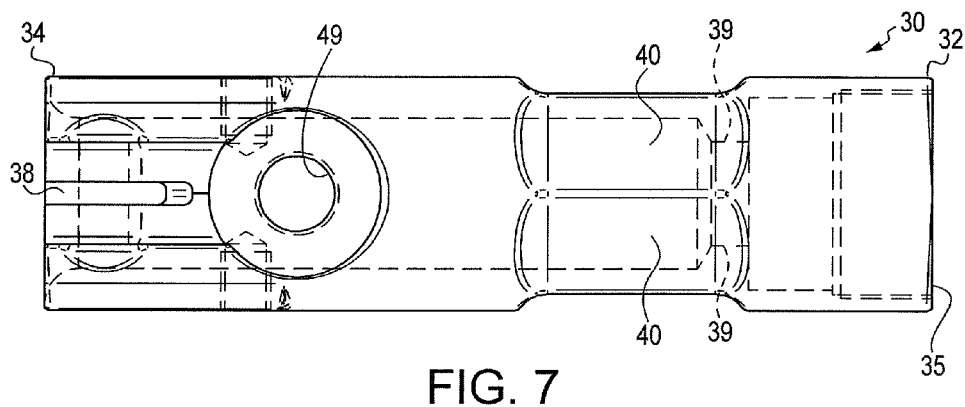
Figure 8:
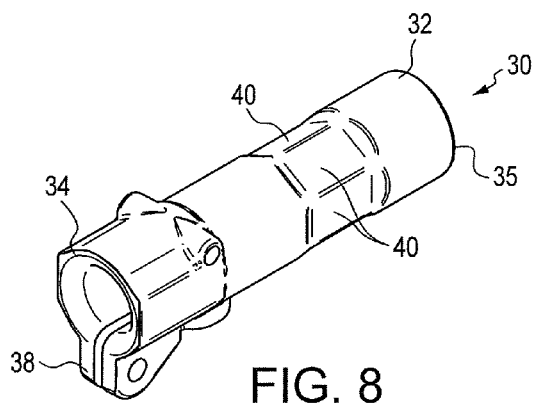

FIGS. 6-8 illustrate a preferred configuration for the primary housing member 30. Specifically, FIG. 6 is a side elevational view of the primary housing 30. FIG. 7 is a view of the underside of the housing member 30. The aperture 49 for receiving the key member 46 is shown in FIG. 7. And FIG. 8 is a perspective view of the primary housing 30 illustrating its distal end 34. The primary housing 30 defines an aperture 35 at the proximal end 32. Also, as best illustrated in FIGS. 3-5 and 7, the primary housing 30 also provides an interior collar 39 for receiving, guiding, and/or supporting the feedscrew 70.

Figure 9:
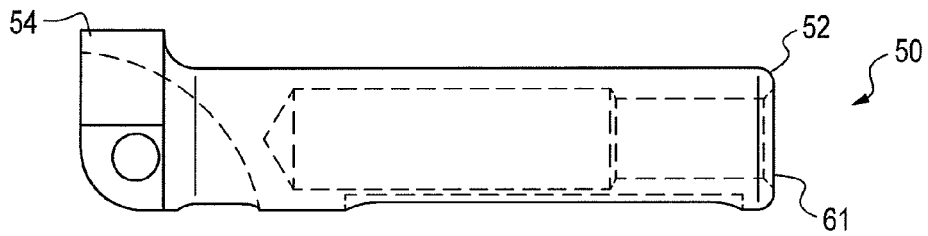
FIGS. 9-12 illustrate a preferred configuration for a secondary housing of the preferred embodiment tool.
Figure 10:
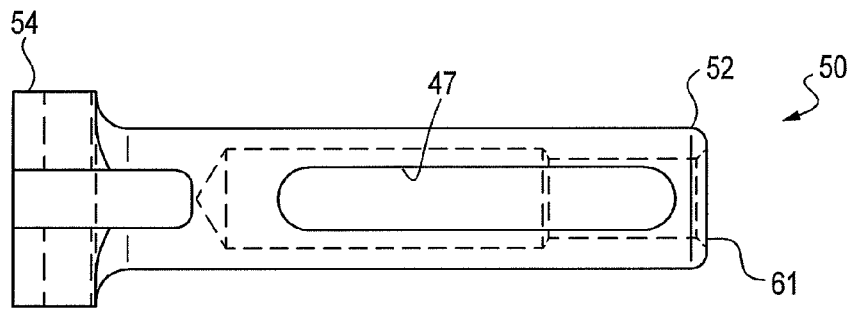
Figure 11:
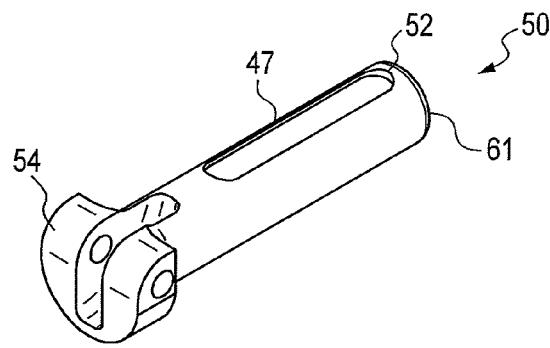
Figure 12:
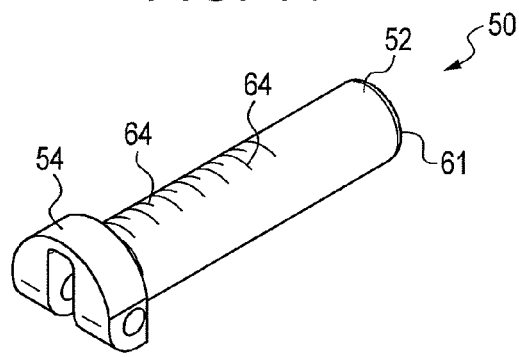

FIGS. 9-12 illustrate a preferred configuration for the secondary housing member 50. Specifically, FIG. 9 is a side elevational view of the secondary housing 50. FIG. 10 is a view of the underside of the housing 50. FIG. 11 is a perspective view of the distal end 54 of the housing 50 illustrating its underside. And, FIG. 12 is a perspective view of the distal end 54 of the housing 50 illustrating a topside of the housing 50. The channel 47 for receiving the key member 46 is depicted in FIGS. 10 and 11.

Figure 13:
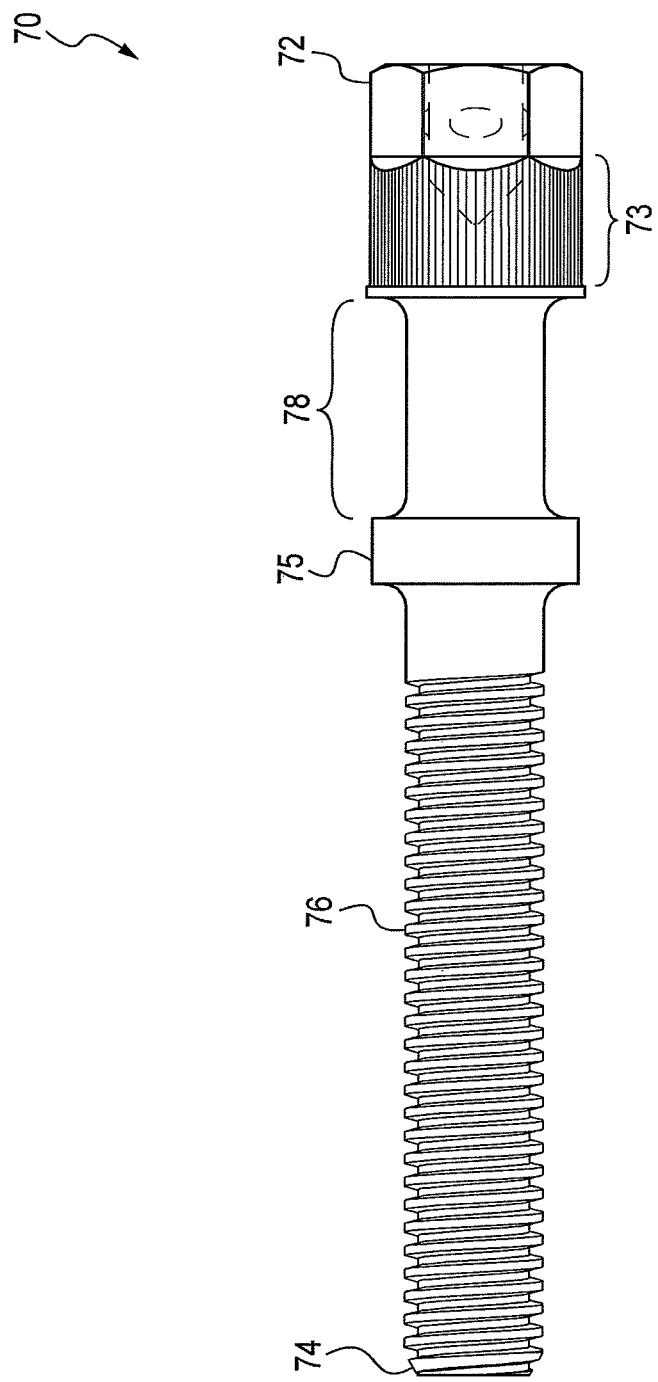
FIG. 13 is an elevational view of a preferred configuration for a feedscrew used in the preferred embodiment tool.

FIG. 13 illustrates a preferred feedscrew 70 used in the cutting tool 10. The feedscrew 70 defines a proximal end 72 and an opposite distal end 74. The rotary grip 14 is disposed within a grip receiving region 73 defined along a portion of the length of the feedscrew 70. As shown in FIGS. 2-5, the feedscrew 70 extends from the proximal end 32 of the primary housing 30, into an interior region 33 of the primary housing 30, into the proximal end 52 of the secondary housing 50, and into the hollow chamber 53 of the secondary housing 50. The feedscrew 70 in certain embodiments, also includes a radially extending shoulder 75. The feedscrew 70 defines one or more threads 76 or thread receiving regions along its outer periphery and generally between the ends 72, 74 of the feedscrew 70. The one or more threads 76 or thread receiving regions of the feedscrew are in operable and threaded engagement with the one or more threads or thread receiving regions 60 defined in the secondary housing 50, as best shown in FIGS. 3-5.

As illustrated in FIGS. 1-2, the cutting tool 10 also comprises the previously noted cutting chain 90. The cutting chain generally includes one or more chain sections 92, a chain end 94 or region for affixing to the secondary housing 50, and another chain end 96 or region for affixing to the primary housing 30. Each chain section includes a cutting wheel 92a and a post or axle 92b. The chain end 94 is affixed to the tool 10 at the chain engagement provision 58 disposed along the secondary housing 50. The chain end 96 is affixed to the tool 10 at the chain engagement provision 38. The chain end 94 is engaged with the engagement provision 58 by a post or axle 92b positioned within a receiving aperture associated with the engagement provision 58. Similarly, the chain end 96 is engaged with the engagement provision 38 by a post or axle 92b positioned within a receiving aperture associated with the engagement provision 38. Preferably, a releasable capture member 93 is utilized with one or both of the posts 92b at the engagement provisions 38 and/or 58 to provide a convenient releasable engagement provision between the chain and the housing assembly 20. One or more rings 91 may be affixed to sections 92 of the chain to facilitate grasping thereof.

The preferred embodiment cutting tool 10 may comprise additional features. For example, the primary housing 30 may include one or more "flats" or recessed, nonarcuate side wall regions shown in FIGS. 6-8 as flats 40. Providing two or more flats 40 and preferably on radially opposite regions of the outer wall of the primary housing 30 may be useful for facilitating grasping of the housing 30 and/or tool 10 with a wrench or other device. As explained herein, depending upon the level of torque applied to the cutting tool 10, and the type of tool providing the torque, it may in certain applications be beneficial to counter excessive reactional torque that is exhibited by the cutting tool 10. In such instances, the flats 40 may promote gripping of the tool 10.

Referring to FIG. 12, the secondary housing 50 may optionally also include one or more graduations 64 along an outer region of the secondary housing 50. For applications in which numerous pipes having the same or similar outer diameter are to be cut, typically, when preparing the tool 10 prior to performing a cutting operation, the position of the secondary housing 50 relative to the distal end 34 of the primary housing 30 will be the same. And so, providing one or more graduations 64 facilitates linear positioning of the secondary housing 50 relative to the primary housing 30.

The feedscrew 70 may additionally comprise one or more torque limiting sections, such as shaft section 78 shown in FIG. 13. In the event an excessive level of torque is applied to the proximal end 72 of the feedscrew, the torque limiting section 78 prevents transfer of that torque level at a region beyond the shaft section 78 toward the distal end 74 of the feedscrew. The torque limiting section 78 typically has a reduced diameter and/or other dimensional characteristics such that upon application of an excessive level of impact torque, the portion of the feedscrew 70 deflects or flexes in the region 78 to thereby significantly reduce the amount of impact torque otherwise transmitted to the distal end 74 and/or an intermediate region of the feedscrew 70.

As best shown in FIGS. 3-5, the feedscrew 70 is preferably concentrically positioned within the primary housing 30 and the secondary housing 50. The feedscrew 70 is preferably positioned within the aperture 35 defined along the proximal end 32 of the primary housing 30, within the aperture 62 defined along the proximal end 52 of the secondary housing 50, and preferably, also positioned within the interior collar 39 of the primary housing 30. Although one or more bearing assemblies could be used, typically the use of one or more thrust washers such as washers 24 is sufficient for guiding and supporting the feedscrew 70 within the housing assembly. Referring to FIGS. 2-5, the tool 10 further comprises a split washer 25 and a hand flange 27. The split washer 25 and the hand flange 27 are disposed on one side of the feedscrew shoulder 75, and the washers 24 are disposed on an opposite side of the feedscrew shoulder 75.

The cutting tool 10 is configured such that upon applying a load to the feedscrew 70, e.g. applying torque to the proximal end 72 during a cutting operation, the secondary housing 50 is retracted into the primary housing 30.

Although the cutting tools can use a wide array of cutting chains, in certain embodiments, it may be useful to include provisions for quickly and easily attaching two sections of cutting chain together. It may be desirable to provide a chain of longer length when cutting relatively large diameter pipes. A chain affixment assembly comprising a nut strap, a threaded pin, and a cutter wheel, is provided for attaching two ends of chain or chain sections together. The nut strap includes a U-shaped longitudinal member with opposite ends extending at right angles. Each end portion defines an aperture. Two apertured ends of cutting chain or chain sections are positioned in the nut strap such that the chain end apertures are aligned with the nut strap apertures. A cutting wheel, also having a center opening, is positioned within the nut strap, between the chain ends, and also aligned with the other noted apertures. A threaded pin is then inserted in the aligned apertures and secured therein. Preferably, the outer diameter of the head of the threaded pin is smaller than the outer diameter of the cutting wheel.

In certain embodiments, the cutting tool also comprises a plurality of cutting chain sections. One end of the cutting chain or a link or region of the chain, is attached to the housing assembly as previously noted. And, another end of the cutting chain or a link or region of the chain or a different section of cutting chain is attached at a different member of the housing assembly. If multiple chain sections are used, it is preferred to provide releasable engagement provisions on corresponding ends of the cutting chain. It will be understood that the term "chain sections" as used herein refers to portions of the overall cutting chain used in the cutting tool which can be selectively and readily engaged with one another. Preferably, the chain sections can be readily engaged with another and disengaged from one another without the use of any tools. Thus, a user can easily disengage two or more chain sections from one another manually. And, a user can easily engage or otherwise attach two or more chain sections to one another.

Figure 14:
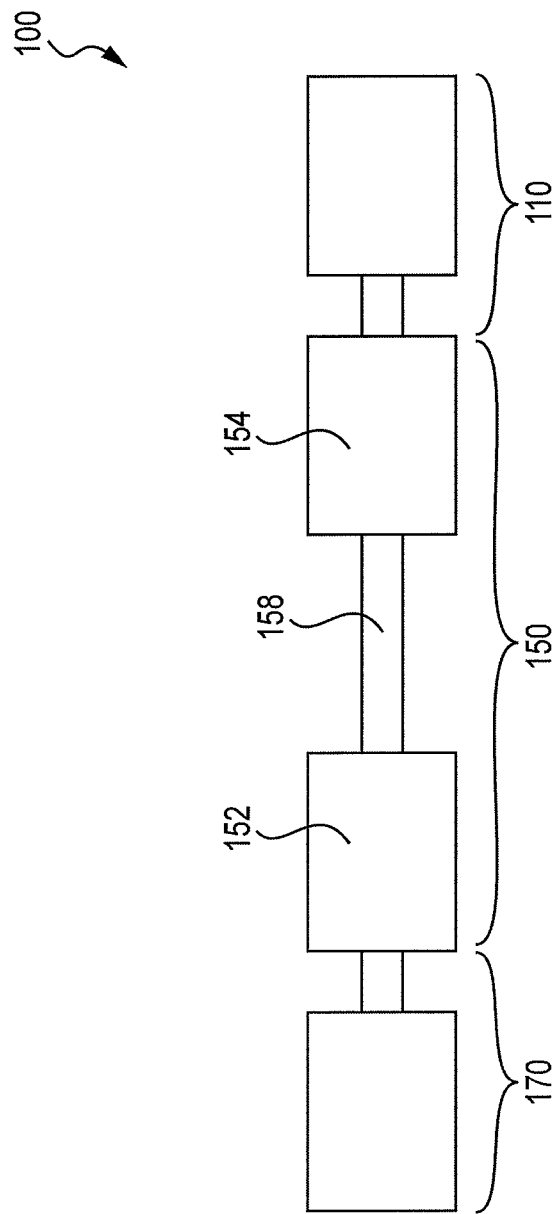
FIG. 14 is a schematic block diagram illustrating another preferred embodiment of a rotary powered tool system in accordance with the present subject matter.

FIG. 14 is a schematic block diagram illustrating a rotary powered tool system 100 in accordance with the present subject matter. The tool system 100 comprises a tool 110, a rotary power source 170, and a drive assembly 150 for selectively engaging the tool 110 to the rotary power source 170. The rotary power source is preferably an impact driver as described herein or capable of providing an impact torque as described herein. The tool 110 can be in the form of an impact socket or working member such as a member for modifying a workpiece. It will be understood that item 110 in FIG. 14 can also be in the form of a receptacle for engaging or retaining a tool. The drive assembly 150 includes a distal end 154, a proximal end 152, and a torque limiting provision 158 disposed between the ends 152 and 154. The torque limiting provision 158 is as previously described herein. In a particular version of the system 100, the torque limiting provision 158 is in the form of an integral, one-piece longitudinal member that exhibits a predefined torsional transfer limit such that upon application of a torque to either of the ends 152 or 154 greater than the predefined torsional transfer limit, the member undergoes rotational displacement or flexure to an extent such that the torque as measured at the other end is less than the predefined torsional transfer limit.

The various torque limiting provisions and rotary powered tool systems can be incorporated or implemented in a range of devices. For example, any tool or tool system using a threaded drive assembly such as a feedscrew, or a geared assembly to transfer torque from a powered end to a tool end, is eligible. Non-limiting examples of such devices include cutting or shearing tools, drive cutting blades, crimping tools, other types of tools for preparing workpieces, and roll groovers. Generally, any tool using an impact torque to drive a feedscrew assembly or a gear system can incorporate or utilize one or more of the features described herein.

It will be understood that the powered tool system(s) described herein can be in the form of separate components which are selectively engaged or coupled to one another prior to use, or alternatively be in the form of unified systems which are coupled or engaged to one another. Moreover, such systems may also include selectively engageable and releasable power sources that can be coupled to a drive mechanism.

Many other benefits will no doubt become apparent from future application and development of this technology.

All patents, published applications, and articles noted herein are hereby incorporated by reference in their entirety.

It will be understood that any one or more feature or component of one embodiment described herein can be combined with one or more other features or components of another embodiment. Thus, the present subject matter includes any and all combinations of components or features of the embodiments described herein.

As described hereinabove, the present subject matter solves many problems associated with previous type devices. However, it will be appreciated that various changes in the details, materials and arrangements of parts, which have been herein described and illustrated in order to explain the nature of the subject matter, may be made by those skilled in the art without departing from the principle and scope of the subject matter.

What is claimed is:

1. A pipe cutter comprising:
   a housing assembly including a first member and a second member slidably engaged therewith;
   a feedscrew having a proximal end adapted for receiving a source of rotary power, an opposite distal end, and an external threaded region between the proximal end and the distal end, the external threaded region of the feedscrew being threadedly engaged with the second member of the housing assembly;
   a flexible cutting chain defining a first end and a second end, the first end engaged to the first member of the housing assembly and the second end engaged to the second member of the housing assembly;
   wherein upon application of torque to the proximal end of the feedscrew resulting in rotation of the feedscrew relative to the second member of the housing assembly, the second member of the housing assembly is linearly displaced relative to the first member of the housing assembly, thereby changing the distance between the first end of the cutting chain and the second end of the cutting chain.

2. The pipe cutter of claim 1 wherein the first member of the housing assembly is an outer primary housing member and the second member is a secondary housing member slidably positioned within the primary housing member, the secondary housing member defining a threaded interior bore.

3. The pipe cutter of claim 2 wherein the distal end of the feedscrew is disposed within the interior bore of the secondary housing member and the external threaded region of the feedscrew is threadedly engaged with the threaded interior bore of the secondary housing member.

4. The pipe cutter of claim 3 wherein the secondary housing member is concentrically disposed within at least a portion of the primary housing member.

5. The pipe cutter of claim 3 wherein the feedscrew is concentrically disposed within at least a portion of the secondary housing member.

6. The pipe cutter of claim 3 wherein the outer primary housing member and the secondary housing member include key provisions that allow linear movement of the secondary housing member in a direction parallel with the longitudinal axis of the primary housing member, yet preclude rotation of the secondary housing member relative to the primary housing member.

7. The pipe cutter of claim 1 further comprising:
   an outer rotary grip engaged along the proximal end of the feedscrew.

8. The pipe cutter of claim 1 wherein at least one of the first end and the second end of the cutting chain includes releasable engagement provisions that enable the end of the cutting chain to be manually disengaged from the corresponding housing member.

9. The pipe cutter of claim 3 wherein the secondary housing member defines a distal end and an opposite proximal end, the proximal end of the secondary housing member disposed closer to the proximal end of the feedscrew than the distal end of the secondary housing member, wherein the second end of the cutting chain is engaged to the secondary housing member at the distal end of the secondary housing member.

10. The pipe cutter of claim 1 wherein the feedscrew includes torque limiting provisions.

11. The pipe cutter of claim 10 wherein the torque limiting provisions are defined between the proximal end of the feedscrew and the external threaded region of the feedscrew.

12. The pipe cutter of claim 10 wherein the torque limiting provisions exhibit a predefined torsional transfer limit such that upon application of a torque to a proximal end of the feedscrew greater than the predefined torsional transfer limit, the feedscrew undergoes rotational displacement to an extent such that the torque as measured at the distal end of the feedscrew is less than the predefined torsional transfer limit.

13. The pipe cutter of claim 1 further comprising:
   a handle affixed to the primary housing member.

14. A pipe cutter comprising:
   a housing assembly including an outer primary housing member and a secondary housing member disposed within the primary housing member, the secondary housing member defining a threaded interior bore;
   a feedscrew having a proximal end adapted for receiving a source of rotary power, an opposite distal end, and an external threaded region between the proximal and the distal ends, the distal end disposed within the interior bore of the secondary housing member and the external threaded region of the feedscrew being threadedly engaged with the threaded interior bore of the secondary housing member, the feedscrew including torque limiting provisions which exhibit a predefined torsional transfer limit such that upon application of a torque to a proximal end of the feedscrew greater than the predefined torsional transfer limit, the feedscrew undergoes rotational displacement to an extent such that the torque as measured at the distal end of the feedscrew is less than the predefined torsional transfer limit;
   a flexible cutting member defining a first end and a second end, the first end engaged to the primary housing member and the second end engaged to the secondary housing member;
   wherein upon application of torque to the proximal end of the feedscrew resulting in rotation of the feedscrew relative to the secondary housing member, the secondary housing member is linearly displaced relative to the primary housing member, thereby changing the distance between the first end of the cutting member and the second end of the cutting member.

15. The pipe cutter of claim 14 wherein the torque limiting provisions are defined between the proximal end of the feedscrew and the external threaded region of the feedscrew.

16. A method for cutting a frangible member, the method comprising:
   providing a cutting tool including (i) a housing assembly having an outer primary housing member and a secondary housing member slidably positioned within the primary housing member, the secondary housing member defining a threaded interior bore, (ii) a feedscrew having a proximal end adapted for receiving a source of rotary power, an opposite distal end, and an external threaded region between the proximal end and the distal end of the feedscrew, the distal end disposed within the interior bore of the secondary housing member and the external threaded region of the feedscrew being threadedly engaged with the threaded interior bore of the secondary housing member, and (iii) a flexible cutting chain defining a first end and a second end, the first end engaged to the primary housing member and the second end engaged to the secondary housing member;
   positioning the cutting chain around the frangible member such that multiple points of contact occur between the cutting chain and the frangible member;
   applying torque to the proximal end of the feedscrew resulting in rotation of the feedscrew relative to the secondary housing member, the secondary housing member being linearly displaced relative to the primary housing member, thereby changing the distance between the first end of the cutting chain and the second end of the cutting chain, and thus tensioning the chain to thereby induce cutting of the frangible member.

17. The method of claim 16 wherein the frangible member is a soil pipe.

* * * * *